United States Patent
Lee et al.

(10) Patent No.: US 9,983,703 B2
(45) Date of Patent: May 29, 2018

(54) TOUCH PANEL HAVING A PATTERNED OVERCOATING LAYER FOR REDUCING MOIRÉ PATTERN THAT INTERSECTS WITH AN ELECTRODE PATTERN AT AN ANGLE, LIQUID CRYSTAL DISPLAY DEVICE INCLUDING TOUCH PANEL AND METHOD OF FORMING TOUCH PANEL

(71) Applicant: Hydis Technologies Co., Ltd., Icheon-si, Gyeonggi-do (KR)

(72) Inventors: Ji Hoon Lee, Seoul (KR); Joon Sung An, Seoul (KR); Seong Jung Yun, Hwaseong-si (KR); Hyung Jung Kim, Seongnam-si (KR)

(73) Assignee: Hydis Technologies Co., Ltd., Icheon-si (KR)

( * ) Notice: Subject to any disclaimer, the term of this patent is extended or adjusted under 35 U.S.C. 154(b) by 107 days.

(21) Appl. No.: 14/587,044

(22) Filed: Dec. 31, 2014

(65) Prior Publication Data

US 2015/0242005 A1    Aug. 27, 2015

(30) Foreign Application Priority Data

Feb. 21, 2014 (KR) .......................... 10-2014-0020650

(51) Int. Cl.
G06F 3/041 (2006.01)
G06F 3/044 (2006.01)
G06F 3/045 (2006.01)

(52) U.S. Cl.
CPC .............. *G06F 3/041* (2013.01); *G06F 3/044* (2013.01); *G06F 3/045* (2013.01); *G06F 3/0418* (2013.01);

(Continued)

(58) Field of Classification Search
CPC ........... G06F 3/041; G06F 2203/04103; G02F 1/134309
See application file for complete search history.

(56) References Cited

U.S. PATENT DOCUMENTS

2009/0273577 A1   11/2009 Chen et al.
2011/0157039 A1*  6/2011 Shin .................... G02F 1/13338
                                                    345/173

(Continued)

FOREIGN PATENT DOCUMENTS

CN    101930301 A    12/2010
EP    2 264 577 A2   12/2010

OTHER PUBLICATIONS

Abstract of Korean Patent—KR20090029207, dated Mar. 20, 2009, 2 pages.

(Continued)

*Primary Examiner* — Paul Lee
(74) *Attorney, Agent, or Firm* — Dority & Manning, P.A.

(57) ABSTRACT

A touch panel, a liquid crystal display device including the touch panel, and a method of forming the touch panel may be provided, wherein the touch panel includes an electrode layer having an electrode pattern for touch sensing; and an overcoating layer formed on an upper portion of the electrode layer and having a pattern forming a predetermined intersection angle with respect to the electrode pattern, and the liquid crystal display device includes the touch panel attached to an upper portion of the liquid crystal display device or formed within the liquid crystal display device.

15 Claims, 4 Drawing Sheets

(52) U.S. Cl.
CPC .............. *G06F 2203/04103* (2013.01); *Y10T 29/49105* (2015.01)

(56) References Cited

U.S. PATENT DOCUMENTS

| | | | | |
|---|---|---|---|---|
| 2012/0075218 A1* | 3/2012 | Lin | ............... | G06F 3/0418 345/173 |
| 2012/0268396 A1* | 10/2012 | Kim | ............... | G06F 3/0412 345/173 |
| 2012/0327349 A1* | 12/2012 | Wang | ............... | G02B 27/26 349/139 |
| 2013/0044074 A1* | 2/2013 | Park | ............... | G02F 1/13338 345/174 |

OTHER PUBLICATIONS

Abstract of Korean Patent—KR20130108220, dated Oct. 2, 2013, 1 page.

\* cited by examiner (a)  (b)

(a)

(b)

(c)

(d)

(a)

(b)

(c)

(d)

(e)

TOUCH PANEL HAVING A PATTERNED OVERCOATING LAYER FOR REDUCING MOIRÉ PATTERN THAT INTERSECTS WITH AN ELECTRODE PATTERN AT AN ANGLE, LIQUID CRYSTAL DISPLAY DEVICE INCLUDING TOUCH PANEL AND METHOD OF FORMING TOUCH PANEL

CROSS-REFERENCE TO RELATED APPLICATION

This application claims the benefit of priority under 35 U.S.C. § 119(a) of Korean Patent Application No. 10-2014-0020650, filed on Feb. 21, 2014, in the Korean Intellectual Property Office, the entire disclosure of which is incorporated herein by reference for all purposes.

1. FIELD

The present invention relates to a touch panel, a liquid crystal display device including the touch panel, and a method of forming the touch panel. More particularly, the present invention relates to a touch panel having an overcoating layer for reducing a moiré pattern, a liquid crystal display device including the touch panel, and a method of forming the touch panel.

2. BACKGROUND

As smartphones are popularly being used, demand for liquid crystal display devices which have touch functions allowing for a touch input to a screen to input a signal thereto has been rapidly increasing.

Such a touch function may be implemented by a touch panel having an electrode layer capable of sensing a touch pressure or variations in a current caused by a touch input and recognizing a touch position. Liquid crystal display devices having the touch function may be manufactured by attaching such a touch panel to an outer portion of an upper substrate or forming the touch panel in the interior of the liquid crystal display device during a process of forming the liquid crystal display device.

The electrode layer of the touch panel may be disposed over all region of a display device in order to sense a touch position and in this case, in order to solve a defect in which a shape of the electrode layer is visually apparent, the electrode layer may be formed to have a regular pattern in which a plurality of lines or a certain surface may be provided.

However, recently, as fine and regular group patterns of an electrode layer used to increase the resolution of a touch input and a pixel pattern of a liquid crystal display device are overlapped with each other, a wavelike-pattern phenomenon, an optical phenomenon generated when two or more regular and periodic patterns are overlapped with each other, that is, a moiré pattern, may be generated. Consequently, an image quality of the liquid crystal display device may be degraded.

RELATED ART DOCUMENT (Patent Document) Korean Patent Registration No. 10-1167007

SUMMARY

Therefore, an aspect of exemplary embodiments of the present invention is to provide a touch panel having an electrode layer and an overcoating layer having a predetermined intersection angle with respect to the electrode layer.

Another aspect of exemplary embodiments of the present invention is to provide a liquid crystal display device in which a moiré pattern is not generated or is reduced due to the overcoating layer having a predetermined intersection angle with respect to the electrode layer.

Another aspect of exemplary embodiments of the present invention is to provide a method of forming the overcoating layer having a pattern.

According to an embodiment of the present invention, there is provided a touch panel including: an electrode layer having an electrode pattern for touch sensing; and an overcoating layer formed on an upper portion of the electrode layer and having a pattern forming a predetermined intersection angle with respect to the electrode pattern.

The intersection angle may be in a range of 10° to 20°. The electrode pattern and the pattern of the overcoating layer may be identical to each other.

The electrode pattern and the pattern of the overcoating layer may be formed such that unit lines are arranged to be parallel with each other in a repeated manner.

The overcoating layer may include: a first overcoating layer formed on the upper portion of the electrode layer and having no pattern; and a second overcoating layer formed on an upper portion of the first overcoating layer and having the pattern.

The pattern of the overcoating layer may be formed by completely etching portions of the overcoating layer or partially etching the portions of the overcoating layer to a predetermined depth.

According to another embodiment of the present invention, there is provided a liquid crystal display device having a lower substrate, an upper substrate bonded to the lower substrate, and a liquid crystal layer interposed therebetween, the liquid crystal display device including: a touch panel attached to an upper portion of the upper substrate or formed within the upper substrate, wherein the touch panel includes: an electrode layer having an electrode pattern for touch sensing; and an overcoating layer formed on an upper portion of the electrode layer and having a pattern forming a predetermined intersection angle with respect to the electrode pattern.

According to another embodiment of the present invention, there is provided a method of forming a touch panel, the method including: forming an electrode layer having an electrode pattern for touch sensing; and forming an overcoating layer having a pattern which forms a predetermined intersection angle with respect to the electrode pattern, on an upper portion of the electrode layer.

The forming of the overcoating layer may include: applying a first overcoating material covering the electrode layer; applying a second overcoating material covering the first overcoating material; and etching the second overcoating material to form a pattern forming a predetermined intersection angle with respect to the electrode pattern.

The forming of the overcoating layer may include: applying an overcoating material covering the electrode layer; and completely or partially etching portions of the applied overcoating material to form a pattern forming a predetermined intersection angle with respect to the electrode pattern.

The intersection angle may be in a range of 10° to 20°. The electrode pattern and the pattern of the overcoating layer may be identical to each other.

The electrode pattern and the pattern of the overcoating layer may be formed such that unit lines are arranged to be parallel with each other in a repeated manner.

DETAILED DESCRIPTION

Figure 1:
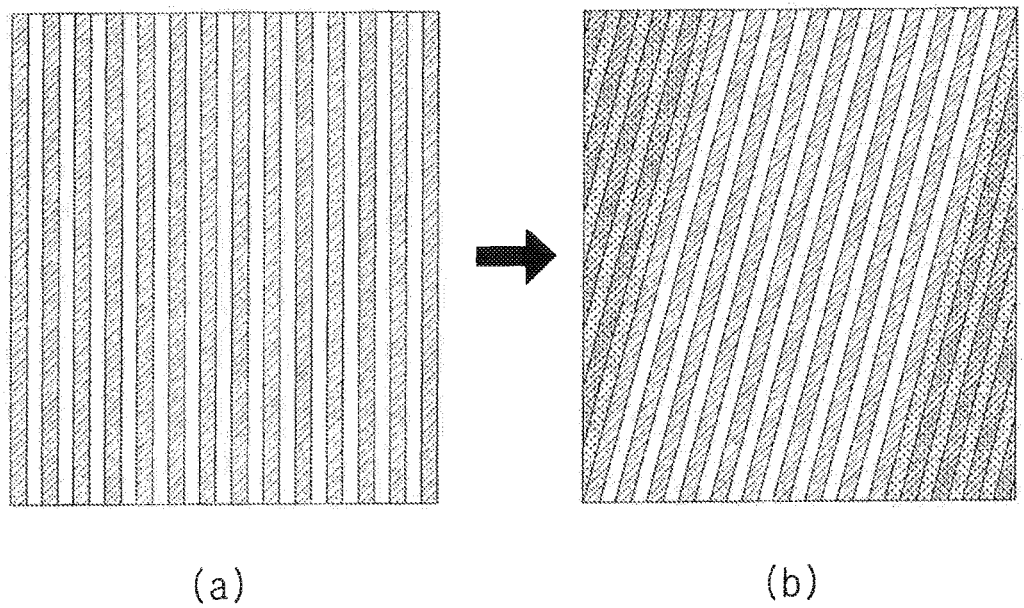
FIG. 1 is a view illustrating defects occurring when an electrode pattern of an electrode layer is deformed.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In exemplary embodiments, the same reference numerals will be used throughout to designate the same or like elements.

Exemplary embodiments of the present invention relate to a touch panel and a liquid crystal display device including the touch panel.

A moiré pattern may be generated due to interference between fine patterns. In a liquid crystal display device including a touch panel, the moiré pattern may be generated in the case that a pattern of an electrode layer of the touch panel and a pixel pattern of the liquid crystal display device (pattern formed by gate lines and/or data lines) interfere with each other.

Such a moiré pattern may be removed by deforming the pattern of the electrode layer of the touch panel and the pixel pattern of the liquid crystal display device so as to not interfere with each other.

However, in the case that the pixel pattern of the liquid crystal display device is deformed in order to remove the moiré pattern, since a driving of the liquid crystal display device may be affected and further, various structural modifications may be accompanied depending on the deformation of the pixel pattern, the deformation of the pixel pattern may not be facilitated.

In addition, as illustrated in FIG. 1(A), an electrode of the electrode layer of the touch panel may need to be extended from one edge of a display region to the other edge thereof opposite thereto, in order to sense a touch input. However, as illustrated in FIG. 1(B), in the case that the electrode of the electrode layer is deformed, a touch input may not be performed in portions of the display region (dotted portions in FIG. 1(B)), and an electrode line may be formed in order to sense the touch input, connection between the electrode line and an external chip being not facilitated.

Accordingly, an exemplary embodiment of the present invention is intended to decrease a moiré pattern generated in a liquid crystal display device including a touch panel by forming a pattern allowing for a reduction of the moiré pattern, on an overcoating layer.

Figure 2:
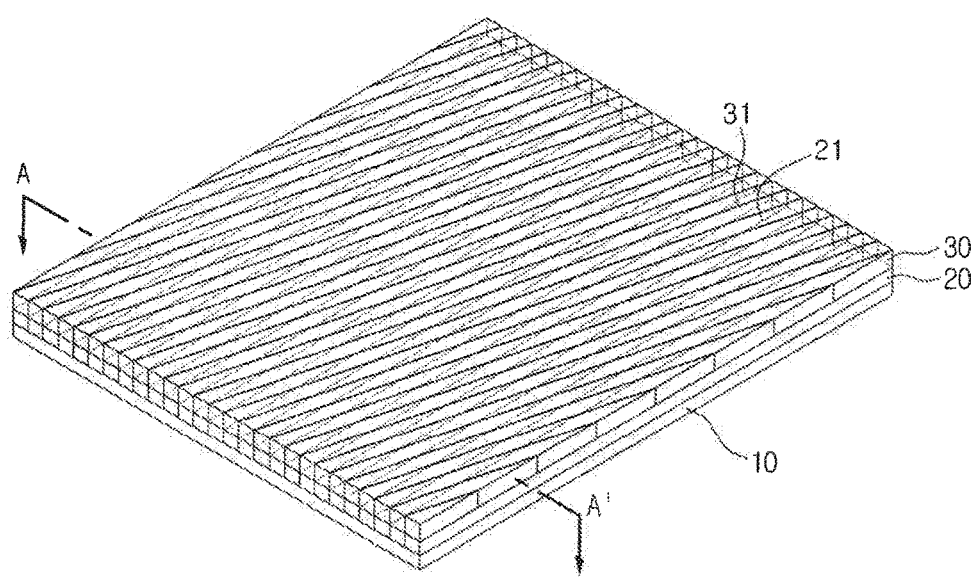
FIG. 2 is a perspective view of a touch panel according to an exemplary embodiment of the present invention.
Figure 3:
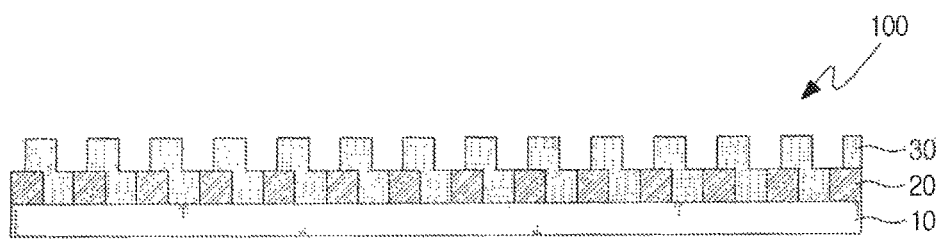
FIG. 3 is a cross-sectional view of FIG. 2, taken along line A-A'.

FIG. 2 is a perspective view of a touch panel according to an exemplary embodiment of the present invention. FIG. 3 is a cross-sectional view of FIG. 2, taken along line A-A'.

As illustrated in FIGS. 2 and 3, the touch panel according to an exemplary embodiment of the present invention may include a substrate 10, an electrode layer 20 disposed on the substrate 10 and having an electrode pattern for touch sensing, and an overcoating layer 30 having a pattern forming a predetermined intersection angle with respect to the electrode pattern.

The substrate 10 of the touch panel may be a base plate for forming the electrode layer. Thus, in a case in which the touch panel is not formed integrally with the liquid crystal display device, the substrate 10 may be a film or a glass film for forming the electrode layer thereon. In a case in which the touch panel is formed integrally with the liquid crystal display device, the substrate 10 may be a layer of the liquid crystal display device positioned below the electrode layer 20. In addition, in a case in which the touch panel is formed integrally with a cover window, the substrate may be omitted.

The electrode layer 20 may be a layer having an electrode 21 for touch sensing. The electrode layer, a layer for sensing a touch position, may have a touch sensing electrode formed thereon, the touch sensing electrode being formed of a transparent conductive material, a transparent conductive film, a fine metallic line, or the like. In addition, depending on design requirements, the electrode layer may be configured of a single layer or two layers.

The electrode 21 of the electrode layer 20 may have a regular pattern in which unit electrode lines are arranged to be parallel with each other in a repeated manner, for example, in order to sense a touch input within the display region and to prevent the pattern from being visible externally.

The overcoating layer 30, a layer formed on the electrode layer 20, may have a pattern offsetting a regular period of the electrode pattern of the electrode layer.

Since the overcoating layer 30, a layer for protecting the electrode layer, may not sense and transfer a signal unlike the electrode layer, any pattern may be freely formed thereon. However, in order to reduce the moiré pattern, the overcoating layer may be patterned so as to form a predetermined intersection angle ($\theta$) with respect to the electrode pattern of the electrode layer disposed below the overcoating layer.

In this case, the intersection angle ($\theta$) may preferably be, an angle of 10° to 20° with respect to the electrode pattern.

Figure 4:
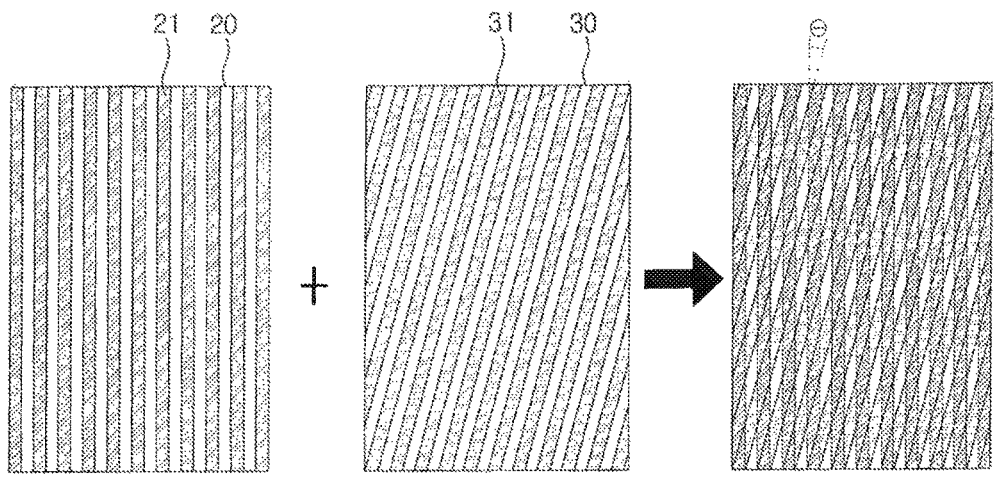
FIG. 4 is a plan view of a form in which the electrode pattern of the electrode layer and a pattern of an overcoating layer are overlapped with each other.

In addition, the pattern of the overcoating layer may preferably be identical to the electrode pattern of the electrode layer disposed below the overcoating layer. That is, as illustrated in FIG. 4, while the pattern of the overcoating layer 30 may be formed to be identical to the electrode pattern of the electrode layer 20, an alignment angle of the pattern of the overcoating layer 30 with respect to the electrode pattern of the electrode layer 20 may be changed, such that the two patterns may have a predetermined intersection angle ($\theta$) when they are overlapped with each other.

Figure 5:
FIG. 5 is a view illustrating a method of forming a touch panel according to an exemplary embodiment of the present invention.
Figure 5:
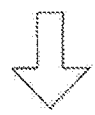
Figure 5:
Figure 5:
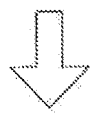
Figure 5:
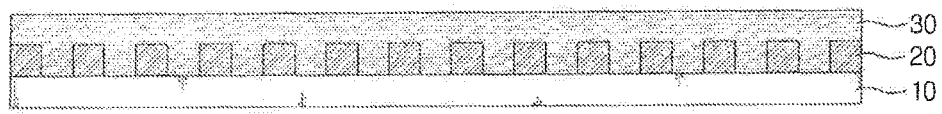
Figure 5:
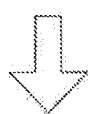
Figure 5:
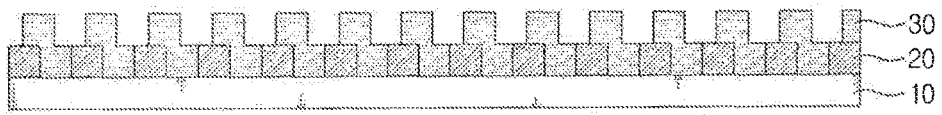

A method of manufacturing the touch panel according to an exemplary embodiment of the present invention will be described in detail as follows with reference to FIG. 5.

First, a transparent conductive material may be applied to the substrate 10 in order to from the electrode layer 20 (FIG. 5(A))

The applied transparent conductive material may be etched, whereby the transparent conductive material may have a certain electrode pattern formed thereon (FIG. 5(B)).

Then, a material for forming the overcoating layer may be applied to the electrode layer 20 (FIG. 5C). Examples of the material for forming the overcoating layer may include all types of materials for forming an overcoating layer according to the related art, such as SiNx, $SiO_x$, $SiO_x$+$SiN_x$, and the like.

Then, the material of the overcoating layer may be etched to form a pattern having a predetermined intersection angle with respect to the electrode pattern of the electrode layer disposed below the overcoating layer (FIG. 5D). In this case, in order to form the pattern of the overcoating layer, regions of the overcoating layer may be completely etched up to contact portions thereof contacting an upper surface of the electrode as illustrated in FIG. 5D. In some cases, regions of the overcoating layer may be partially etched to a predetermined depth and thus, be formed such that the electrode of the electrode layer is not exposed externally.

Figure 6:
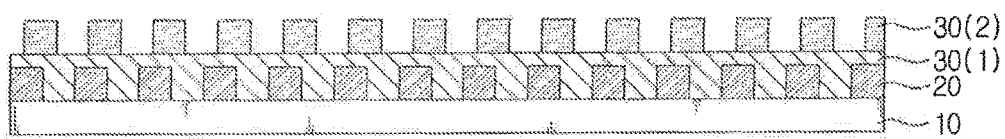
FIG. 6 is a cross-sectional view of a touch panel according to another exemplary embodiment of the present invention.

In addition, in order to prevent a portion of the electrode layer from being etched together with the overcoating layer or keep the electrode of the electrode layer from being exposed externally due to an inappropriate control of an etching operation during the etching of the overcoating layer, the overcoating layer may be formed of two layers including a first overcoating layer 30(1) for protecting the electrode layer and a second overcoating layer 30(2) for forming the pattern of the overcoating layer as illustrated in FIG. 6, instead of etching the overcoating layer only to a predetermined depth.

Figure 7:
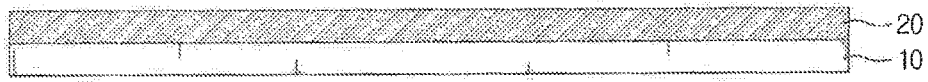
FIG. 7 is a view illustrating a method of forming a touch panel according to another exemplary embodiment of the present invention.
Figure 7:
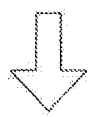
Figure 7:
Figure 7:
Figure 7:
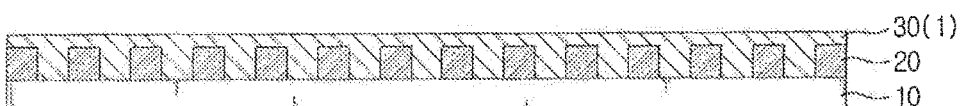
Figure 7:
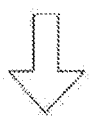
Figure 7:
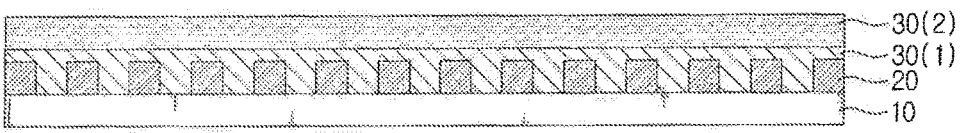
Figure 7:
Figure 7:
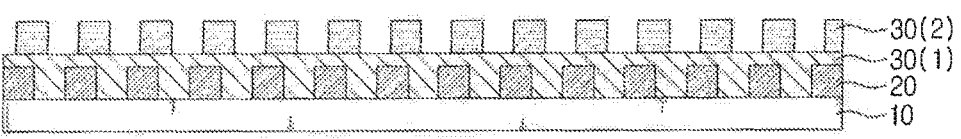

This will be explained in more detail as follows. As illustrated in FIG. 7, a transparent conductive material for forming a conductive layer may be applied to the substrate 10 (FIG. 7(A)). After forming an electrode pattern (FIG. 7(B)) by etching the conductive material, a material for forming the first overcoating layer may be applied to an upper portion of the electrode layer (FIG. 7C). The first overcoating layer, a layer for protecting the electrode layer, may have no pattern formed therein.

Then, a material for forming the second overcoating layer may be applied to the first overcoating layer (FIG. 7D). The second overcoating layer may be etched, whereby a pattern thereof having a predetermined intersection angle with respect to the electrode pattern of the electrode layer may be formed (FIG. 7E).

The first overcoating layer and the second overcoating layer may be formed of any material used to form an overcoating layer according to the related art. However, since the first overcoating layer may serve to protect the electrode layer during an etching process of the second overcoating layer, the material for forming the first overcoating layer may have an etch rate lower than that of the second overcoating layer.

In addition, it may be preferable that a thickness of the first overcoating layer (a distance between an upper surface of the electrode layer and a lower surface of the second overcoating layer) may be smaller than a thickness of the second overcoating layer, such that the pattern of the overcoating layer 30 formed of the first overcoating layer and the second overcoating layer may be apparently discernable.

Until now, the touch panel according to an exemplary embodiment of the present invention has been limitedly described by way of concrete examples. However, the right scope of the present invention is not limited to the touch panel and includes cases in which the touch panel is attached to an upper portion of the liquid crystal display device or is formed within the liquid crystal display device. In a case in which the liquid crystal display device and the touch panel are integrally formed, a substrate of the touch panel may be omitted. Since methods of attaching the touch panel to the upper portion of the liquid crystal display device or forming the touch panel in the interior of the liquid crystal display device have been widely known to a person having ordinary skill in the art, a detailed description thereof will be omitted.

As set force, according to exemplary embodiments of the present invention, a touch panel including an electrode layer and an overcoating layer having a predetermined intersection angle with respect to the electrode layer, and methods of forming such an overcoating layer may be provided.

In addition, according to exemplary embodiments of the present invention, a liquid crystal display device in which a moiré pattern is not generated or is reduced due to the overcoating layer having a predetermined intersection angle with respect to the electrode layer, may be provided.

While the present disclosure has been shown and described in connection with the embodiments, it will be apparent to those skilled in the art that modifications and variations can be made without departing from the spirit and scope of the disclosure as defined by the appended claims.

What is claimed is:

1. A touch panel comprising:
   an electrode layer having an electrode pattern for touch sensing; and
   an overcoating layer formed on the electrode layer and having an overcoating pattern forming a predetermined intersection angle with respect to the electrode pattern in a plan view;
   wherein the electrode pattern is formed such that unit electrode lines extending along a first axis on the plan view are arranged to be parallel to each other at a predetermined interval, wherein the overcoating pattern is formed such that unit overcoating lines extending along a second axis on the plan view are arranged to be parallel to each other at a predetermined interval, and wherein the first axis intersects the second axis at the predetermined intersection angle.

2. The touch panel according to claim 1, wherein the intersection angle is in a range of 10° to 20°.

3. The touch panel according to claim 1, wherein the electrode pattern and the overcoating pattern are identical to each other.

4. The touch panel according to claim 1, wherein the overcoating layer includes:
   a first overcoating layer formed on the electrode layer and having no pattern; and
   a second overcoating layer formed on the first overcoating layer and having the pattern.

5. The touch panel according to claim 1, wherein the overcoating pattern is formed by completely etching portions of the overcoating layer or partially etching the portions of the overcoating layer to a predetermined depth.

6. A liquid crystal display device having a lower substrate, an upper substrate bonded to the lower substrate, and a liquid crystal layer interposed therebetween, the liquid crystal display device comprising:
   a touch panel attached on the upper substrate or formed within the upper substrate, wherein the touch panel includes:
an electrode layer having an electrode pattern for touch sensing; and
an overcoating layer formed on the electrode layer and having an overcoating pattern forming a predetermined intersection angle with respect to the electrode pattern in a plan view;
wherein the electrode pattern is formed such that unit electrode lines extending along a first axis on the plan view are arranged to be parallel to each other at a predetermined interval, wherein the overcoating patter is formed such that unit overcoating lines extending along a second axis on the plan view are arranged to be parallel to each other at a predetermined interval, and wherein the first axis intersects the second axis at the predetermined intersection angle.

7. The liquid crystal display device of claim 6, wherein the intersection angle is in a range of 10° to 20°.

8. The liquid crystal display device of claim 6, wherein the electrode pattern and the overcoating pattern are identical to each other.

9. The liquid crystal display device of claim 6, wherein the overcoating layer includes:
a first overcoating layer formed on the electrode layer and having no patter; and
a second overcoating layer formed on the first overcoating layer and having the pattern.

10. The liquid crystal display device of claim 6, wherein the overcoating pattern is formed by completely etching portions of the overcoating layer or partially etching the portions of the overcoating layer to a predetermined depth.

11. A method of forming a touch panel, the method comprising:
forming an electrode layer having an electrode pattern for touch sensing; and
forming an overcoating layer having a pattern which forms a predetermined intersection angle with respect to the electrode pattern, on the electrode layer in a plan view;
wherein the electrode pattern is formed such that unit electrode lines extending along a first axis on the plan view are arranged to be parallel to each other at a predetermined interval, wherein the overcoating pattern is formed such that unit overcoating lines extending along a second axis on the plan view are arranged to be Parallel to each other at a predetermined interval, and wherein the first axis intersects the second axis at the predetermined intersection angle.

12. The method of claim 11, wherein the forming of the overcoating layer includes:
applying a first overcoating material covering the electrode layer;
applying a second overcoating material covering the first overcoating material; and
etching the second overcoating material to form a pattern forming a predetermined intersection angle with respect to the electrode pattern.

13. The method of claim 11, wherein the forming of the overcoating layer includes:
applying an overcoating material covering the electrode layer; and
completely or partially etching portions of the applied overcoating material to form a pattern forming a predetermined intersection angle with respect to the electrode pattern.

14. The method of claim 11, wherein the intersection angle is in a range of 10° to 20°.

15. The method of claim 11, wherein in the forming of the overcoating layer, the pattern of the overcoating layer is formed to be identical to the electrode pattern.

* * * * *